UNITED STATES PATENT OFFICE.

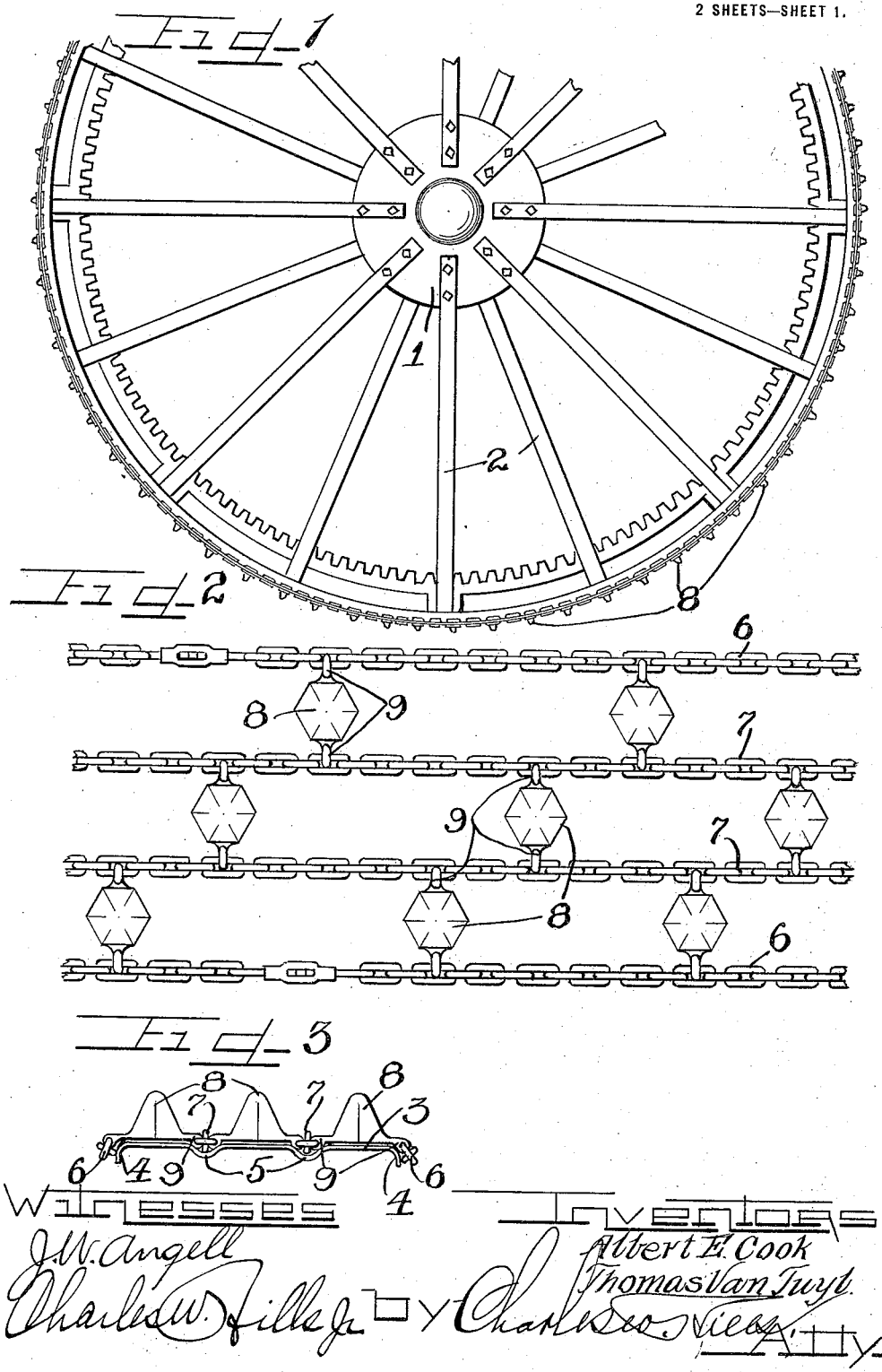

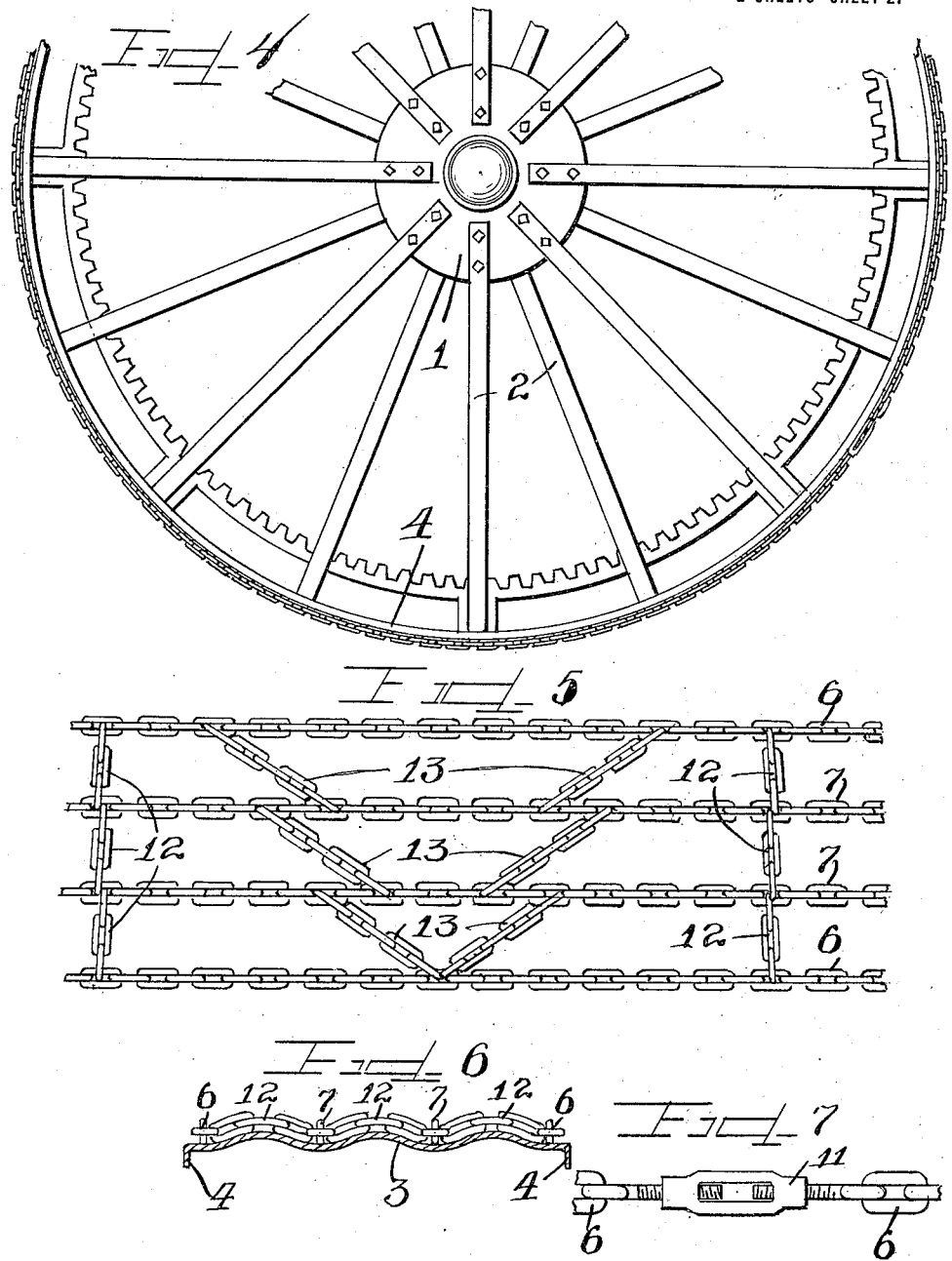

ALBERT E. COOK, OF ODEBOLT, IOWA, AND THOMAS VAN TUYL, OF KANKAKEE, ILLINOIS; SAID VAN TUYL ASSIGNOR TO SAID COOK.

SELF-CLEARING TRACTOR-WHEEL.

1,156,212.  Specification of Letters Patent.  Patented Oct. 12, 1915.

Application filed December 6, 1911. Serial No. 664,162.

*To all whom it may concern:*

Be it known that we, ALBERT E. COOK and THOMAS VAN TUYL, citizens of the United States, and residents of the city of Odebolt, in the county of Sac and State of Iowa, and Kankakee, Kankakee county, Illinois, respectively, have invented certain new and useful Improvements in Self-Clearing Tractor-Wheels; and we do hereby declare that the following is a full, clear, and exact description of the same, reference being had to the accompanying drawings, and to the numbers of reference marked thereon, which form a part of this specification.

Tractor wheels of all kinds, as heretofore constructed, are rendered much more difficult in operation by the adhesion of earth thereto when in use upon soft ground, and various tractor lugs as applied to such wheels, have been used in the attempt, in part, to obviate this difficulty. Such lugs heretofore have been rigidly secured to such wheels, though some of the same have been engaged thereto by means of bolts to permit removal for renewal or repair. A large number of such lugs are usually employed upon a single tractor wheel, and, owing to the labor entailed in removing the same, it is common practice to go upon the roads without such removal, although the condition of the road may be such as to render the lugs unnecessary, and notwithstanding that the weight upon the tractor wheels causes very serious injury to the roads, sometimes entailing large expense for repairs. Because of such injury to the roads, in some communities ordinances and laws have been passed forbidding the travel of tractors upon roads without first removing the tractor lugs from the wheels, and in consequence, where such laws or ordinances obtain, a large amount of time is consumed sometimes even in moving from one field to another where it becomes necessary for the tractor to travel even for a short distance upon the highway.

The object of this invention is to provide a relatively light and strong tractor wheel equipped with lugs adapted to be simultaneously removable therefrom and secured thereto to permit relative movement thereon to clean the periphery of the wheel.

It is also an object of the invention to afford a construction whereby the tractor lugs may be quickly and simultaneously engaged in place upon the wheel for use on soft ground, and whereby the maximum tractive effort of the machine may be secured through the medium of such lugs and to afford also a construction whereby the maximum width of bearing surface may be secured upon soft ground and a bearing surface of less width afforded when upon the highway and after the removal of the lugs.

The invention embraces many novel features and in its preferred form is illustrated in the drawings and hereinafter more fully described.

In the drawings: Figure 1 is a fragmentary side elevation of a wheel embodying our invention, showing the removable lugs in place thereon. Fig. 2 is an enlarged detail plan view illustrating the manner of connecting the lugs with each other and for securing the same upon the wheel. Fig. 3 is a fragmentary transverse section of the wheel rim shown in Fig. 1, with the lugs attached thereto and enlarged. Fig. 4 is a view similar to Fig. 1, but illustrating a slightly modified construction. Fig. 5 is a view similar to Fig. 2, of the lug construction, illustrated in Fig. 4. Fig. 6 is a section similar to Fig. 3, of the tire or tread construction shown in Fig. 4, and showing the removable lugs in place. Fig. 7 is an enlarged fragmentary detail illustrating one means for attaching and tightening the tractor chains and lugs.

As shown in the drawings: 1, indicates the tractor wheel, provided with a hub and spokes 2, of any desired construction, and having the tread or tire 3, peripherally grooved or corrugated. As shown in Fig. 3, the tire is constructed of a relatively light steel plate bent or formed to the proper circumference and provided at each edge with an integral inturned flange 4, serving to stiffen the edges of the tire and greatly increase the strength thereof. Said tire externally is preferably smooth and without projections of any kind and in the construction shown in Figs. 1 to 3 inclusive, is provided intermediate its edges with peripheral grooves or corrugations 5, the number of which will vary with the width of tread of the wheel. In said construction two of said peripheral grooves are used, and the surface of the tread transversely between said grooves and between the grooves and the edges of the tire are flat and substantially in the same line, as shown in Fig. 3. Extending peripherally around the tire are chains 6, and 7, said chains 6, being arranged laterally of the tire and bearing against the inturned flanges 4, and the chain 7, extending peripherally around the tire and lying in the grooves or corrugations 5, and when in place being of less length than the perimeter of the tire except in said grooves. Lugs 8, are provided on opposite sides with eyes 9, through which are permanently engaged links in the adjacent parallel chains, to-wit, the chains 6 and 7, or the chains 7 and 7, as shown in Figs. 2 and 3, said lugs being arranged staggering with each other around the periphery of the wheel. As shown, the laterally disposed lugs may extend beyond the edges of the tire and inwardly therefrom, as shown in Fig. 3, to carry the chain 6, sufficiently inward from the periphery to securely engage said chains in place. Any suitable means may be provided on the adjacent ends of each chain to permit the same to be engaged together and drawn tight, for example the turn buckle construction 11, illustrated in Fig. 7, or any equivalent therefor.

The construction illustrated in Figs. 4 to 6 inclusive is as before described except that the tire, instead of being peripherally grooved intermediate its edges affording flat faces therebetween, is corrugated to afford a plurality of outwardly sprung or formed rounded corrugations affording greater circumference thereat than at the edges of the tire. As shown, three of such outwardly sprung or rounded corrugations are shown, though, of course, the number will vary, and secured thereon are tractor chains 6 and 7, as before described, which may be connected by means of lugs 8, such as before described, or may be connected transversely by means of relatively short chain sections 12, extending directly across the tire and over said corrugations or by the diagonally arranged chain sections 13, the latter, if used, being preferably arranged in successive series, both oblique with the tread of the wheel and at an angle with each other, as shown in Fig. 5. Such transverse chains may be of larger links, if preferred, and if desired, the outer chains 6, may either extend outside the peripheral tire flanges 4, or may bear upon the tread of the wheel, as shown in Fig. 6, inasmuch as the outwardly sprung corrugations afford a sufficient increase over the perimeter at the location of the chain to prevent such chains creeping laterally thereon.

The operation is as follows: When it is desired to use a machine equipped with such wheels upon soft ground or relatively soft ground, or wheresoever the same may be used requiring the lugs, the chains having the lugs thereon, (whether in the form illustrated in Figs. 2 and 3, or in the form illustrated in Figs. 5 and 6) are quickly secured in place around the wheel, and the chains 6 and 7, drawn tight, and the ends secured together. As the wheels rotate, slight slippage of the chains and lugs thereon peripherally of the wheel, serves to cleave any adhering material therefrom, keeping the periphery of the wheel clean, while the weight exerted upon the chains affords adequate traction for the machine.

Obviously, the corrugated construction of the tire enormously increases the strength thereof, enabling a much lighter wheel to be constructed without decrease in strength.

When the lugs are no longer required, for example, when going upon a paved highway or street, the ends of the chains are disconnected, simultaneously removing all the lugs from the wheels, thereby obviating any possibility of injury to the street surface. Upon a paved street, the bearing surface of the wheel is somewhat reduced, owing to the corrugations before described. In some instances this is an important advantage, as tending to obviate any tendency to lateral slip of the wheel.

Obviously, details of the construction may be varied, and we do not purpose limiting the patent to be granted on this application otherwise than necessitated by the prior art.

We claim as our invention:

1. In a device of the class described the combination with a tractor wheel having a corrugated tire with grooves extending peripherally around the same and having flat tread surfaces between the grooves, of a plurality of chains laid in parallel relation one in each of said grooves, and pointed lugs bearing against the flat tread surfaces of said wheel and disposed between said grooves and connected to adjacent chains and held in position thereby.

2. The combination with a tractor wheel having a peripherally grooved tire with flat tread surfaces between the grooves, of a plurality of chains laid around the wheel in parallel relation in said grooves independent of positive connection with the wheel, means for tightening and loosening said chains, and a pointed tractor lug disposed at various points on the flat tread surfaces of the wheel between the grooves and connected to adjacent chains lying in said grooves.

3. In a device of the class described the combination with a tractor wheel having a plurality of continuous parallel peripheral grooves extending therearound affording flat tread surfaces therebetween, of chains unconnected with the wheel and laid in said grooves, and a plurality of tractor lugs arranged in staggered relation loosely on the periphery of the wheel between the grooves therein resting on the flat tread surfaces, said lugs connected to and held at the proper position relative one another by adjacent chains.

In testimony whereof we have hereunto subscribed our names in the presence of two subscribing witnesses.

ALBERT E. COOK.
THOMAS VAN TUYL.

Witnesses:
GEORGE R. MOORE,
CHARLES W. HILLS, Jr.

Copies of this patent may be obtained for five cents each, by addressing the "Commissioner of Patents, Washington, D. C."